No. 746,055. PATENTED DEC. 8, 1903.
D. FERGUSON.
COKE DRAWER.
APPLICATION FILED APR. 27, 1903.
NO MODEL.
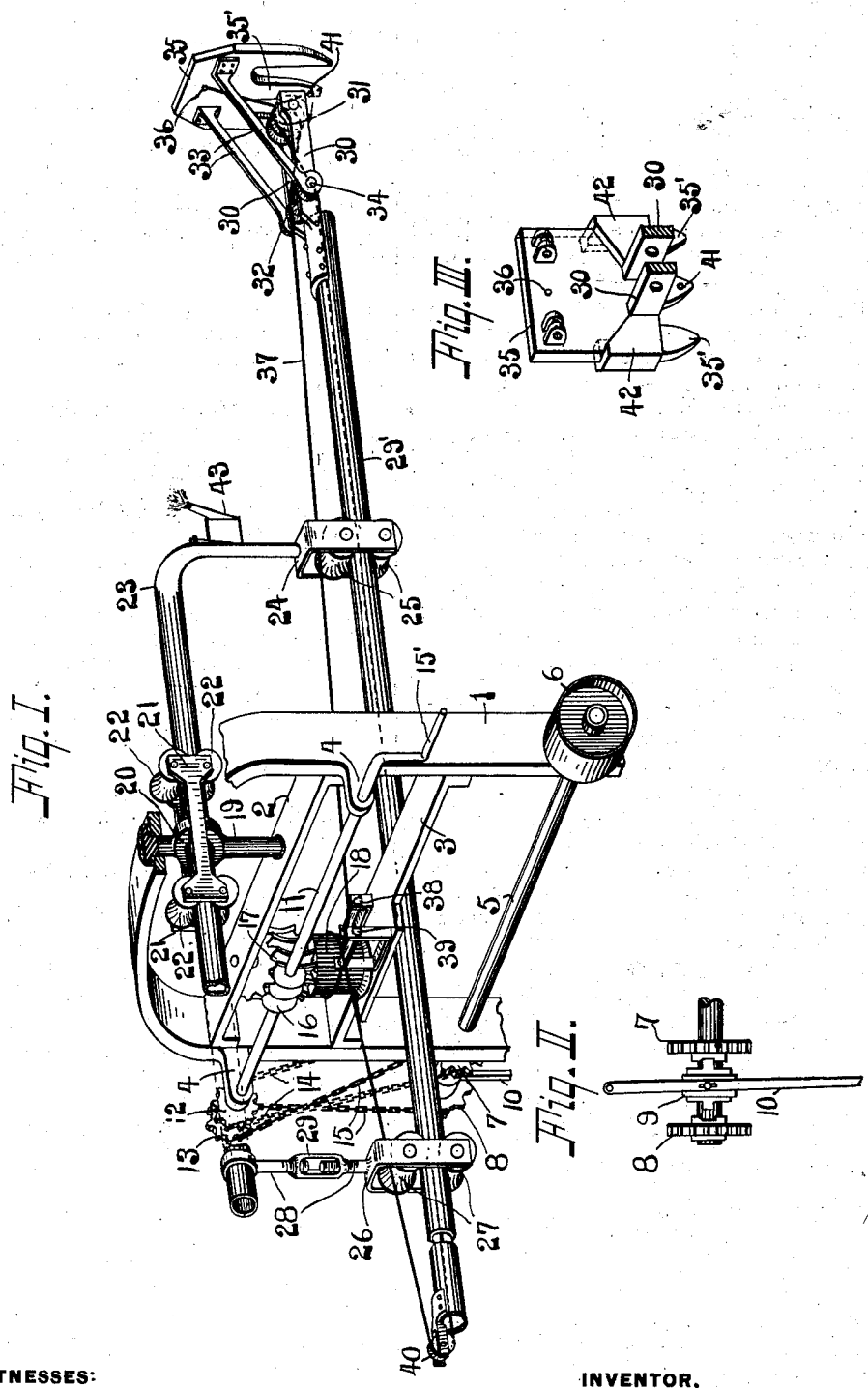
WITNESSES:
Geo. H. Harvey.
F. N. Barber.
INVENTOR,
David Ferguson,
by his Attorney Wm. L. Pierce.

No. 746,055. Patented December 8, 1903.

UNITED STATES PATENT OFFICE.

DAVID FERGUSON, OF PITTSBURG, PENNSYLVANIA.

COKE-DRAWER.

SPECIFICATION forming part of Letters Patent No. 746,055, dated December 8, 1903.

Application filed April 27, 1903. Serial No. 154,438. (No model.)

*To all whom it may concern:*

Be it known that I, DAVID FERGUSON, a citizen of the United States, residing at Pittsburg, in the county of Allegheny and State of Pennsylvania, have invented or discovered new and useful Improvements in Coke-Drawers, of which the following is a specification.

In the accompanying drawings, which make part of this specification, Figure I is a perspective of a coke-drawer constructed in accordance with my invention; Fig. II, a side elevation of the clutch mechanism used with my coke-drawer; and Fig. III, a fragmentary view in perspective, showing a modified form of the fork-guiding mechanism.

My invention relates to mechanism for withdrawing coke from coke-ovens. The objects thereof relate more particularly to the means for causing the fork to engage with the coke and withdraw the same. I provide means for making the fork move down into or behind the coke, and when the said movement of the fork ceases the same means causes the withdrawal of the fork and the coke in front of it.

Referring to the drawings, 1 is a vertically-arranged U-shaped frame.

2 and 3 are horizontal bars connecting the sides of the frame, and 4 4 are rearwardly-projecting ears on the edges of the said sides.

Journaled in the sides of the frame 1 is a shaft 5, having fixed thereon at one end the driving-pulley 6, by which the coke-drawing device is caused to operate. On the end of the shaft 5 opposite that on which the pulley is are the two sprocket-wheels 7 and 8, each driven by the usual clutch 9, operated by the lever 10.

Journaled in the ears 4 is the shaft 11, carrying the sprocket-wheels 12 and 13, on which are sprocket-chains 14 and 15, respectively, running on the sprocket-wheels 7 and 8, respectively. The chain 15 is crossed. A crank 15' is shown on the shaft 11 for use as an alternative to the pulley 6.

On the shaft 11 is a worm 16, meshing with the worm-wheel 17, integral or rigid with the drum 18, journaled between the bars 2 and 3.

Pivotally supported between the top of the frame 1 and the bar 2 is the vertical post 19, which has therein the eye 20, supporting at its sides the I-shaped bars 21. Between the ends of the bars 21 are spaced pairs of rollers 22, whose faces are curved so as to form circular openings between them in horizontal line with the eye 20. The bar 23 is reciprocal in the eye 20 and between the pairs of opposing rollers 22. The forward end of the bar 23 has a vertical portion terminating in a fork 24, in which are supported the two concave rollers 25.

A fork 26, supporting concave rollers 27, is carried on the rear end of the bar 23 by the rod 28, whose two screw-threaded sections are connected by the turnbuckle 29.

29' is the coke-drawing bar, held and guided between the two pairs of rollers 25 and 27. Between the bars 30 on the front end of the tubular drawer-bar 29' is the grooved roller 31, and rearwardly of the same is a roller 32, whose axis forms outside the bars 30 the pivots 34, on which the guide-arms 33 oscillate. The forward ends of the links 33 are rigidly attached to the rear face of the coke-drawing fork or rake 35. The fork 35 has the tines or fingers 35' on its lower side and a scraping edge on its upper side.

Near the top of the fork 35, at the point 36, is attached one end of a cord, cable, or chain 37, which from the point 36 is passed under the roller 31, over the roller 32, and the top roller 25, over the guide-roller 38, supported on the bar 3, around the drum 18, over the roller 39, supported on the bar 3 at a higher level than the roller 38, over the top roller 27, over the roller 40, supported on the end of the bar 29', through said bar, under roller 32, and over roller 31 to the point 41, where the other end of the cord, cable, or chain is attached, said point 41 being below the point 36 and near the free end of the middle one of the tines 31.

Instead of using the arms 33, I may cause the bars 30 to terminate in a pair of guides 42, in which the fork 35 slides up and down. The guide may be constructed so as to inclose a larger portion of the fork or rake than shown, and the front of the guides may meet or be integral, as is clear. I may also use the arms 33 with the guides 42.

43 is a lamp on the front of the bar 23 to light the interior of the coke-oven.

The operation is as follows: The drawings illustrate the fork or rake nearly as high as the cable 37 can raise it. When the drum pulls the lower limb of the cable, so that the point 41 on the fork 35 is at the upper side of the roller 31, that limb can travel no farther, and the upper limb of the cable to the left of the drum begins to pull the bar 29 longitudinally to the right, which causes it to enter the door of the coke-oven. The supporting-frame for the rake, which consists of the bar 23, the forks 24 and 26, the rollers 25 and 27, and the rod 28, is pushed toward and into the oven at the same time by the rear end of the drawer-bar engaging the rollers 27 and serves as a fulcrum for balancing the rake while the operator is swinging or moving it to the desired position therein. In this position of the said frame the lamp 43 will light the interior of the oven, so that the operator may clearly see where to place the fork-teeth. The clutch member 9 is withdrawn by the lever 10 from the sprocket-wheel 7 or 8, which it may be driving when the rake is as far in as desired and moved to engage the other sprocket-wheel 7 or 8. As one of the chains 14 and 15 is crossed the latter movement of the clutch member 9 will reverse the rotation of the drum 18, and consequently the travel of the cable 37. At first the travel of the upper limb of the cable to the left will pull the fork or rake 35 downwardly, and when it has moved so that the point 36 is at the level of the lower side of the roller 31 or it has moved down as far as it can go the cable will draw the rake and the rod 29' longitudinally to the left, pulling the coke out through the oven-door onto an endless belt or other device. The rake-supporting frame will be pulled to the left also by the engagement of the arms 33 with the rollers 25, so as to make easy any handling that the coke-drawing bar 29' may need to have.

The side bars 21 are rigidly attached to or cast with the eye 20 or other part of the post 19.

The operation of the fork 35 shown in Fig. III is the same as of that shown in Fig. I.

The rake 35 may be inverted, so that the upper edge may be used as a scraper.

While I have shown specific mechanism which embodies my invention, I do not wish to be limited to the precise mechanism shown, nor do I desire to be limited to the art of coke-making.

While I use the word "rake" in the claims, it may or may not be toothed, as is clear.

Having described my invention, I claim—

1. In a mechanical rake or drawer, a drawer-bar, a rake carried thereby and having movement transversely thereof, means connected to said rake and to said bar which initially causes the rake to travel transversely of the bar and when the travel of the rake has reached a limit causes the bar with the attached rake to travel longitudinally.

2. In a mechanical rake or drawer, a hollow drawer-bar a rake carried thereby and having movement transversely thereof, a winding-drum and a cable or the like secured to the rake and passing around the drum and through the said bar.

3. In a mechanical rake or drawer, a drawer-bar, a rake carried thereby and having movement transversely thereof, a winding-drum and a cable or the like connected to the rake to cause the rake to travel initially transversely of the bar until a limit has been reached and then to cause the bar with the attached rake to travel longitudinally.

4. In a mechanical rake or drawer, a drawer-bar, a U-shaped holder therefor in a bearing in each arm of which the bar is slidable, and a swivel mounting for such holder to permit horizontal oscillation of the bar.

5. In a mechanical rake or drawer, a frame, a winding-drum mounted thereon, a drawer device, a cable wound on the drum, and means for keeping the parts of the cable from engaging each other at the drum, said cable being attached to the drawer device.

6. In a mechanical rake or drawer, a frame, a swiveled device carried thereby, a U-shaped slidable holder carried by the swiveled device, a drawing device slidably carried by said holder, and means for moving the drawing device longitudinally.

7. In a mechanical rake or drawer, a reciprocal bar, and a reversible blade carried thereby, and having a rake on one edge and a scraper on the other together with means for moving the blade transversely of the bar.

Signed at Pittsburg, Pennsylvania, this 17th day of April, 1903.

DAVID FERGUSON.

Witnesses:
F. N. BARBER,
M. A. BUSHMAN.